(12) United States Patent
Dorion (10) Patent No.: US 7,395,753 B2
(45) Date of Patent: Jul. 8, 2008

(54) COMESTIBLE PRODUCT PRESS

(75) Inventor: Christopher M. Dorion, Elmhurst, IL (US)

(73) Assignee: AMCO Houseworks, LLC, Vernon Hills, IL (US)

( * ) Notice: Subject to any disclaimer, the term of this patent is extended or adjusted under 35 U.S.C. 154(b) by 0 days.

(21) Appl. No.: 11/745,265

(22) Filed: May 7, 2007

(65) Prior Publication Data

US 2007/0289455 A1 Dec. 20, 2007

Related U.S. Application Data

(60) Provisional application No. 60/815,009, filed on Jun. 20, 2006.

(51) Int. Cl.
*A47J 19/06* (2006.01)
*A47J 42/34* (2006.01)

(52) U.S. Cl. .......................... 99/495; 99/506; 100/234; 100/243; 100/213; 100/112; 100/110

(58) Field of Classification Search .................. 99/495, 99/506, 508; 100/234, 243, 213, 125, 110, 100/112
See application file for complete search history.

(56) References Cited

U.S. PATENT DOCUMENTS

| 35,554 | A | | 6/1862 | Thomas |
|---|---|---|---|---|
| 61,251 | A | | 1/1867 | Reece et al. |
| 76,539 | A | | 4/1868 | Smith |
| 256,372 | A | | 4/1882 | Rex |
| 331,236 | A | | 11/1885 | Herrick |
| 620,047 | A | | 2/1899 | Neal |
| 713,034 | A | | 11/1902 | White |
| 1,530,586 | A | | 3/1925 | Wack |
| 1,542,322 | A | * | 6/1925 | Rollman .................. 100/135 |
| 1,959,615 | A | * | 5/1934 | Derrah .................... 100/125 |
| 2,288,393 | A | | 6/1942 | Cheesman |
| 3,016,075 | A | * | 1/1962 | Mantelet .................. 99/504 |
| 4,309,943 | A | | 1/1982 | Larsen et al. |
| 4,414,886 | A | | 11/1983 | Gonzales et al. |
| 4,531,457 | A | | 7/1985 | Sivaslian |
| 4,711,167 | A | | 12/1987 | Sano |
| 5,031,524 | A | | 7/1991 | Wettlaufer |

(Continued)

FOREIGN PATENT DOCUMENTS

GB 191325775 0/1914

(Continued)

*Primary Examiner*—Reginald L Alexander
(74) *Attorney, Agent, or Firm*—Michael Best & Friedrich LLP (57) ABSTRACT

A comestible product press comprising a first handle having first and second ends; a second handle having first and second ends, wherein the first and second handles are hingedly connected to one another at their first ends; a first protrusion on the first handle, the first protrusion extending toward the second handle when the first and second handles are positioned to define an acute angle therebetween; a second protrusion on the second handle, the second protrusion extending away from the first handle when the first and second handles are positioned to define an acute angle therebetween; and an intermediate member connected to at least one of the first and second handles, wherein the intermediate member substantially fills the space between the first and second protrusions when the first and second handles are brought together.

15 Claims, 10 Drawing Sheets

U.S. PATENT DOCUMENTS

| | | |
|---|---|---|
| 5,339,729 A | 8/1994 | Anderson |
| 5,537,918 A | 7/1996 | Patel et al. |
| 5,720,218 A | 2/1998 | Mendes |
| 5,802,964 A | 9/1998 | Mendes |
| 6,196,122 B1 | 3/2001 | Lai |
| 6,234,074 B1 | 5/2001 | Mangum |
| 6,293,189 B1 | 9/2001 | Evans et al. |
| 6,295,921 B1 | 10/2001 | Stoev |
| 6,382,090 B1 | 5/2002 | Kokkinos et al. |
| D468,975 S | 1/2003 | White |
| 6,553,899 B1 | 4/2003 | Kao |
| 6,966,256 B2 | 11/2005 | Canizares et al. |
| 7,000,535 B2 | 2/2006 | Harrison-Griffin et al. |
| 7,028,606 B2 | 4/2006 | Basora |
| 7,117,785 B2 | 10/2006 | Walker, III |
| 7,162,952 B1 | 1/2007 | Michaud |
| 2005/0081385 A1 | 4/2005 | Ho |
| 2006/0086265 A1 | 4/2006 | Gonzalez |
| 2006/0162578 A1 | 7/2006 | Zellmer et al. |
| 2007/0125244 A1 | 6/2007 | Hensel |

FOREIGN PATENT DOCUMENTS

| | | |
|---|---|---|
| GB | 486487 | 6/1938 |
| WO | WO 82/03820 | 11/1982 |
| WO | WO 03/015593 | 2/2003 |

* cited by examiner

COMESTIBLE PRODUCT PRESS

CROSS REFERENCE TO RELATED APPLICATIONS

This application claims benefit under 35 U.S.C. Section 119(e) of U.S. Provisional Application No. 60/815,009, filed Jun. 20, 2006, which is fully incorporated herein by reference.

BACKGROUND OF THE INVENTION

A number of different comestible product presses exist, such as presses for lemons, limes, garlic, and other foods. Many of such presses are manually operated, and can include one or more handles enabling a user to exert pressure upon a comestible product. Among other things, such pressure can be exerted to extract fluid from the comestible product (e.g., press juice from lemons, limes, or other fruits), to extract any other part of the comestible product (e.g., remove pits or seeds from a food item), and/or to crush, crack, shape, or change the comestible product in any number of different manners.

Although many advancements have already been made in comestible product presses, still others are possible, and offer advantages over conventional comestible product presses

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

A comestible product press 10 according to an embodiment of the present invention is illustrated in FIGS. 1A-8. The comestible product press 10 in the illustrated embodiment comprises first, second, and third portions 12, 14, 16 that cooperate to press comestible product placed therebetween as described in greater detail below. Each of the first, second, and third portions 12, 14, 16 can be made of a single integral piece of material manufactured in any suitable manner, such as by molding, casting, stamping, pressing, machining, and/or other manufacturing operations. In other embodiments, any one or more of these portions 12, 14, 16 can be constructed of multiple elements connected together in any suitable manner, such as by welding or brazing, adhesive or cohesive bonding material, screws, bolts, nails, rivets, pins, clasps, clamps, and other fasteners, threaded, snap-fit, or other inter-engaging connections, and the like.

Figure 1A:
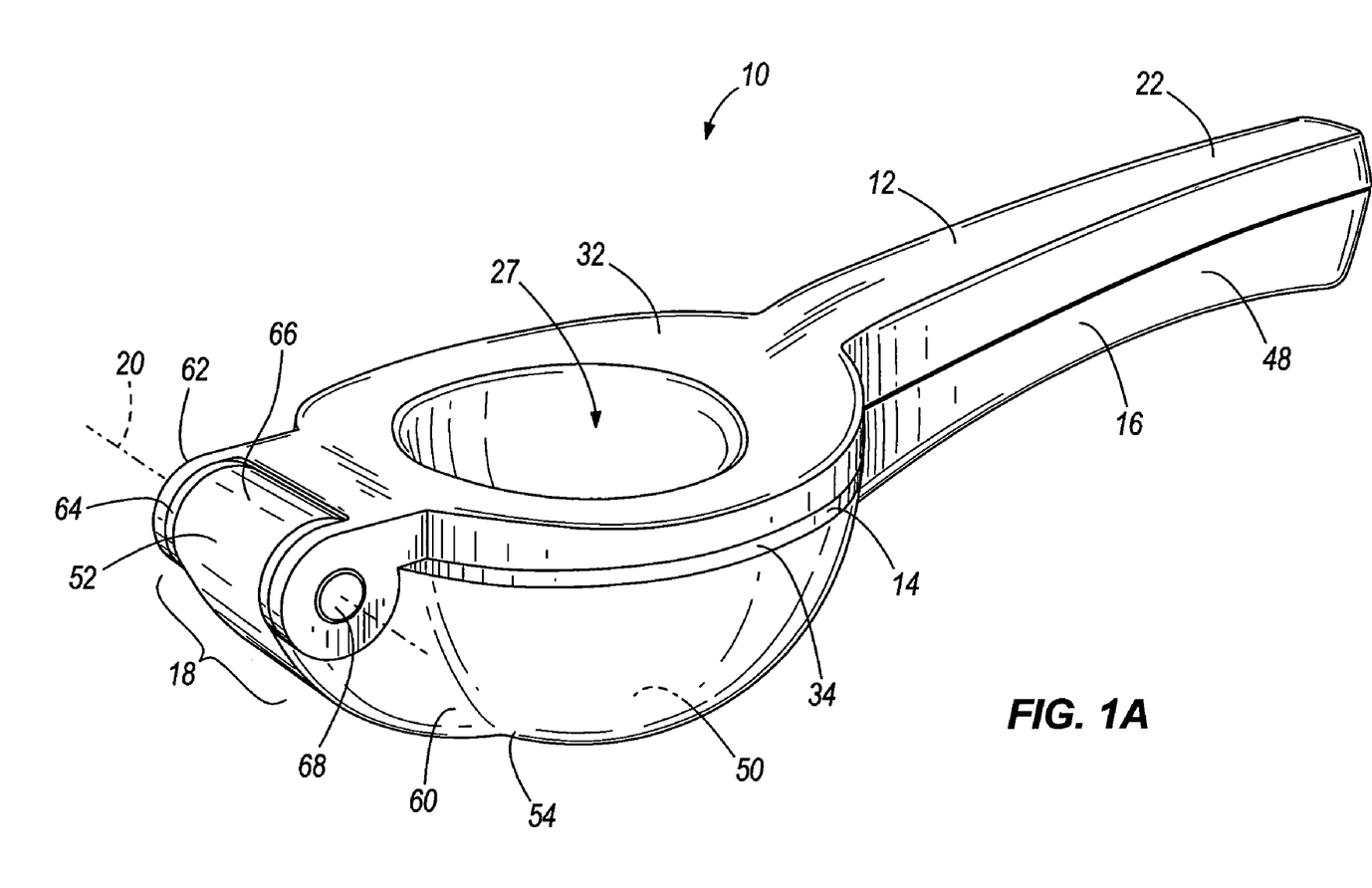
FIGS. 1A-1C are perspective views of a comestible product press according to an embodiment of the present invention.
Figure 1B:
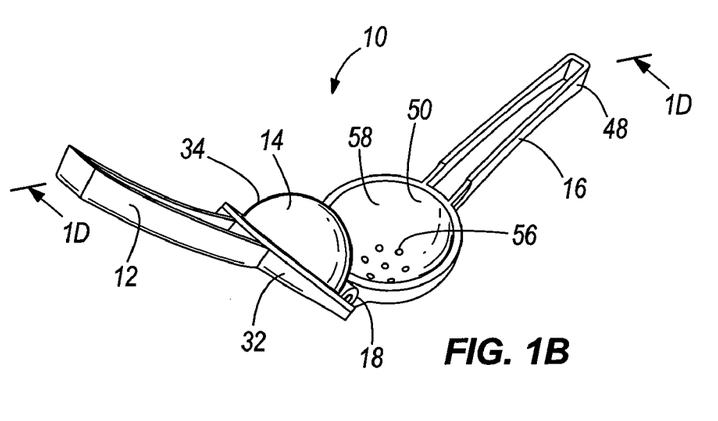
Figure 1C:
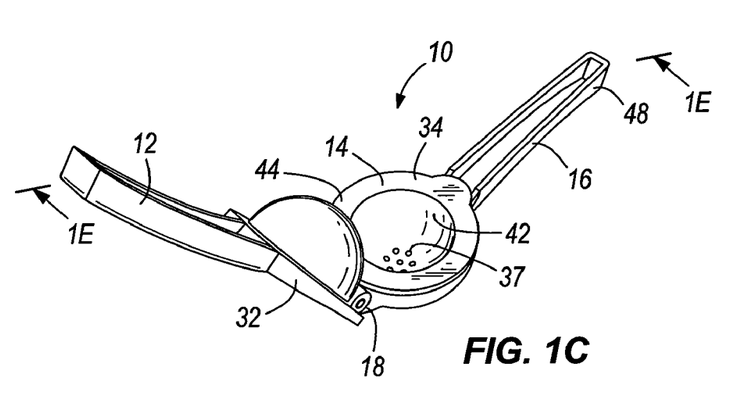
Figure 1D:
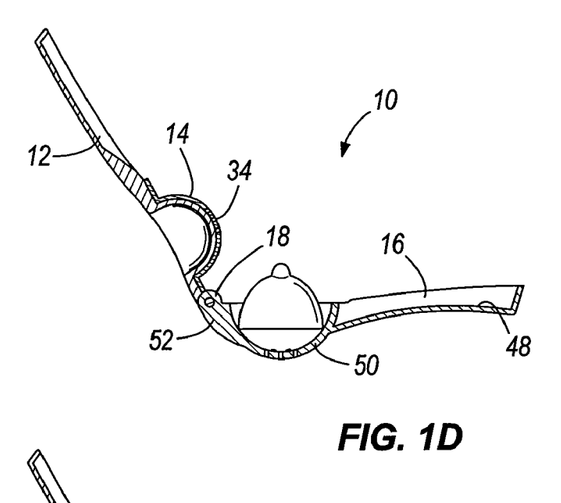
FIGS. 1D-1E are sectional views of a comestible product press according to an embodiment of the present invention.
Figure 1E:
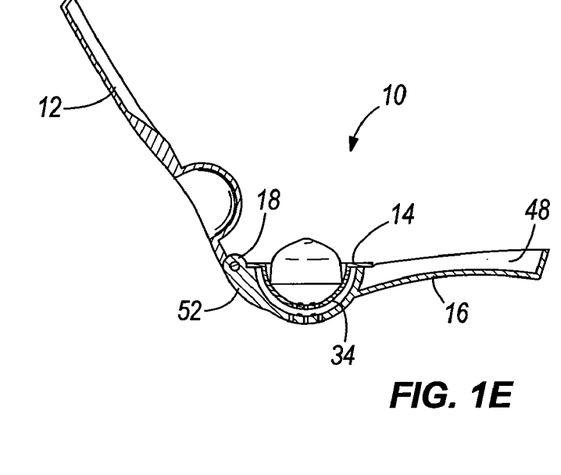

The first, second, and third portions 12, 14, 16 of the illustrated comestible product press 10 are connected by a hinge 18. The hinge 18 enables movement of each of the first, second, and third portions 12, 14, 16 relative to one another. In some embodiments, the hinge 18 enables each of the first, second, and third portions 12, 14, 16 to pivot with respect to one another. With reference to FIG. 1A, this pivoting motion can be about a common axis 20 defined at least in part by portions of the hinge 18 (described in greater detail below).

With reference to FIGS. 5A, 5B, 5C, and 5D the first portion 12 of the illustrated embodiment comprises a handle 22, a protrusion 24, and a hinge portion 26. The protrusion 24 in the illustrated embodiment is generally semi-spherical, or hemispherical, in shape (e.g. FIGS. 5B, 5C, 5D, and 5E), although other protrusion shapes can instead be used. By way of example only, the protrusion 24 can instead be cone-shaped, frusto-conical, pyramid-shaped, or rod-shaped, can be rotund (including oval, elliptical, egg-shaped, and other rotund shapes), can have an irregular shape, or can have any other shape desired. In the illustrated embodiment, the protrusion 24 is adjacent one end of the first portion 12 (FIGS. 5A, 5B, 5C, and 5E).

The protrusion 24 of the first portion 12 of the illustrated embodiment also defines a recess 27 on an opposite side of the first portion 12. The recess 27 can have any shape desired. For example, the recess 27 can have any of the shapes described above with regard to the protrusion 24 of the first portion 12. In some embodiments, the recess 27 has a shape generally corresponding to the shape of the protrusion 24. In other embodiments, the first portion 12 has a recess 27 with a shape different from that of the protrusion 24, or has no recess at all.

The protrusion 24 illustrated in the embodiment of FIGS. 1A-8 has no apertures through which fluid or other matter from comestible product passes during operation of the comestible product press 10. However, in other embodiments, one or more apertures extend through the protrusion 24 for this purpose.

With particular reference to FIGS. 3 and 5A-5E, the protrusion 24 of the first portion 12 can have a profiled surface 28 in order to better facilitate movement of fluid or other comestible product matter across the surface 28. As will be described in greater detail below, in some embodiments, comestible product can be pressed by the protrusion 24 of the first portion 12 against the second portion 14. In such embodiments, it may be desirable to permit movement of fluid or other comestible product matter across the surface 28. To this end, a profiled (i.e., non-smooth) surface 28 of the protrusion 24 can better facilitate this movement. In the illustrated embodiment, the protrusion 24 has a number of ribs 30 extending from a generally central location on the protrusion 24. In other embodiments, ribs on the protrusion 24 can extend in any other direction or combination of directions desired. The profiled surface 28 can be defined at least in part by bumps, ribs, or other types of protuberances, dimples, grooves, or other types of apertures, and any combination thereof located on any portion or all of the protrusion 24.

In some embodiments, the first portion 12 can also have a lip 32 extending peripherally from the protrusion 24. The lip 32 can extend from the protrusion 24 in all directions (see the illustrated embodiment of FIGS. 1A-8) or in less than all directions, as desired.

With reference now to FIGS. 6A, 6B, 6C, and 6D, the second portion 14 of the illustrated comestible product press 10 comprises a cup 34 (or intermediate member) and a hinge portion 36. The cup 34 in the illustrated embodiment is generally semi-spherical, or hemispherical, in shape (e.g. FIGS. 6A, 6B, 6C, and 6D), although other cup shapes can instead be used. By way of example only, the cup 34 can instead have any of the shapes described above with reference to the protrusion 24 of the first portion 12. In some embodiments, the cup 34 has a shape generally corresponding to the shape of the protrusion 24 of the first portion 12. In other embodiments, the cup 34 has a shape different from that of the protrusion 24 of the first portion 12.

Figure 4A:
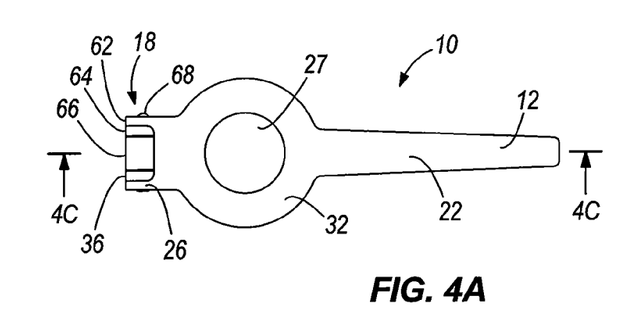
FIGS. 4A-4B are side views of a comestible product press according to an embodiment of the present invention.
Figure 4B:
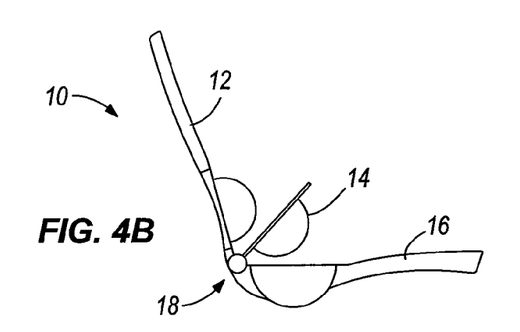
Figure 4C:
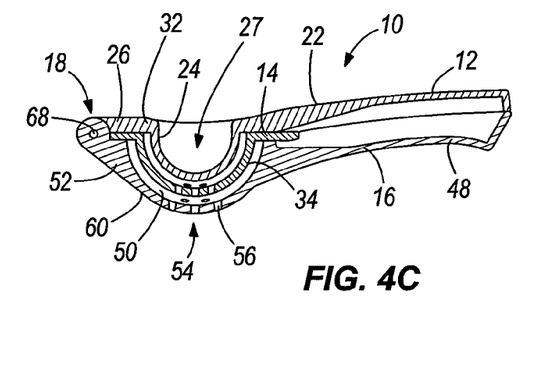
FIGS. 4C-4D are sectional views of a comestible product press according to an embodiment of the present invention.
Figure 4D:
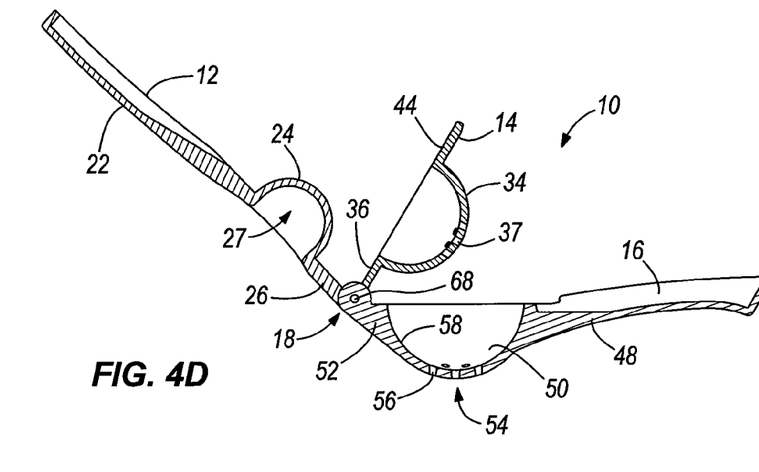

As best shown in FIG. 4C, the cup 34 in the illustrated embodiment is shaped and dimensioned to receive the protrusion 24 of the first portion 12. In other embodiments, the cup 34 is shaped and dimensioned to partially receive the protrusion 24 of the first portion 12, such as the terminal half of the protrusion 24. Accordingly, the protrusion 24 can be nested within the cup 34, and in some embodiments can be smaller than the cup 34. When the handles 22, 48 define an acute angle as shown in FIG. 4C, the protrusion 24 extends towards the handle 48 of the third portion 16. It can be seen that when the handles 22, 48 are brought together as in FIG. 4C, the cup 34 of the second portion 14 substantially fills the space between the protrusion 24 of the first portion 12 and the protrusion 54 of the third portion 16, but for one or more apertures 56 in the cup 34.

Figure 2A:
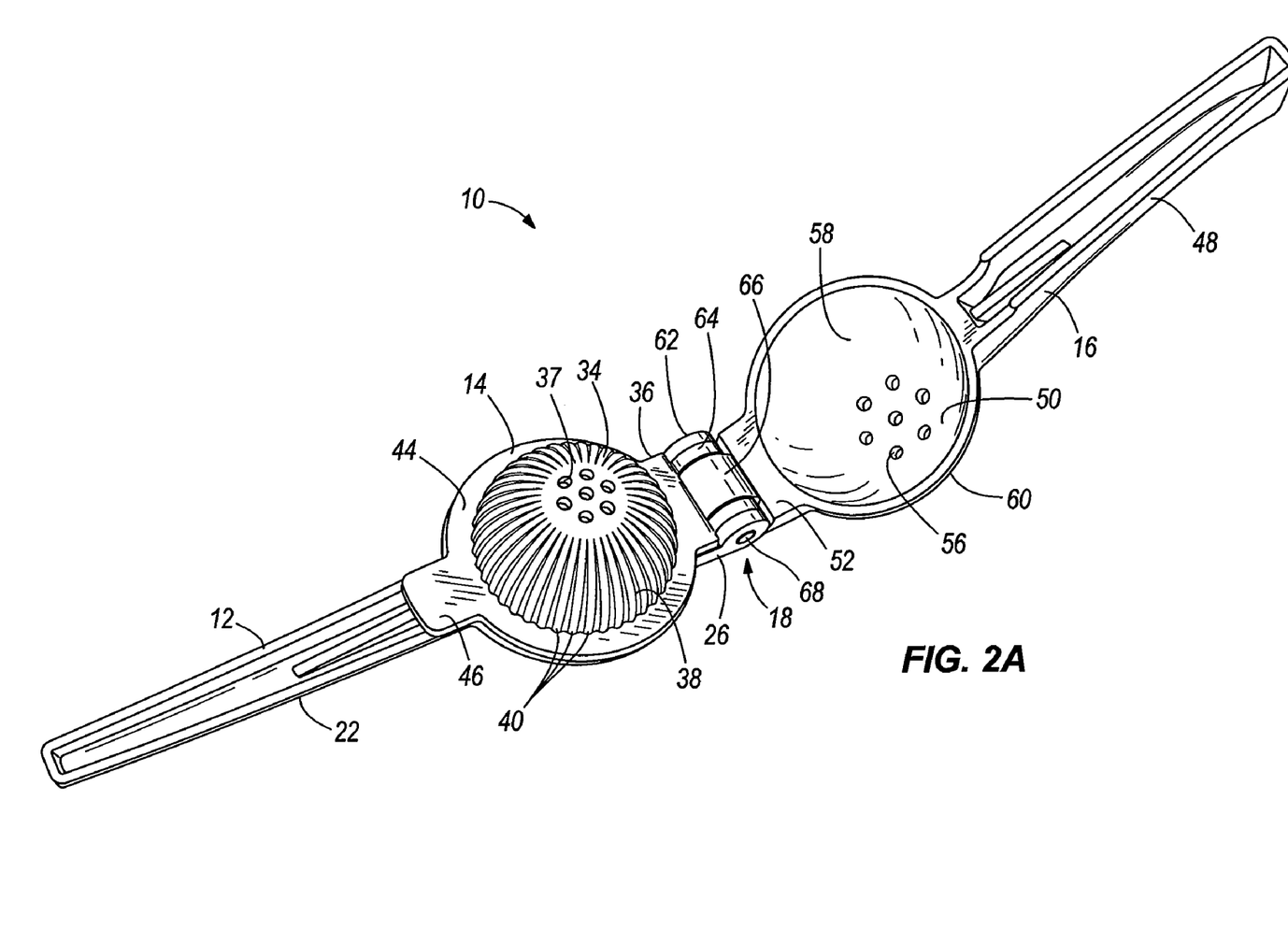
FIGS. 2A-2B are perspective views of a comestible product press according to an embodiment of the present invention.
Figure 2B:
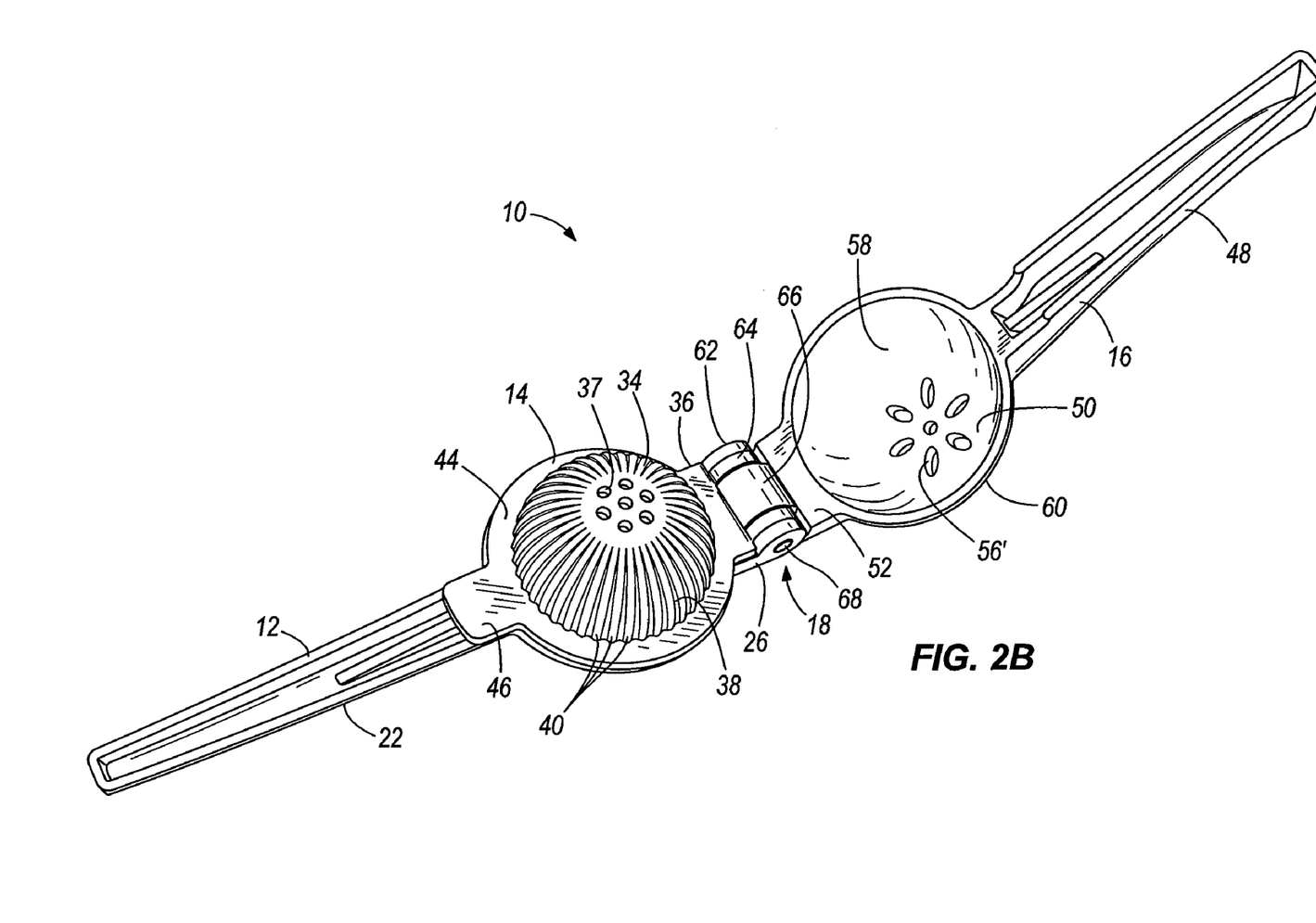
Figure 3:
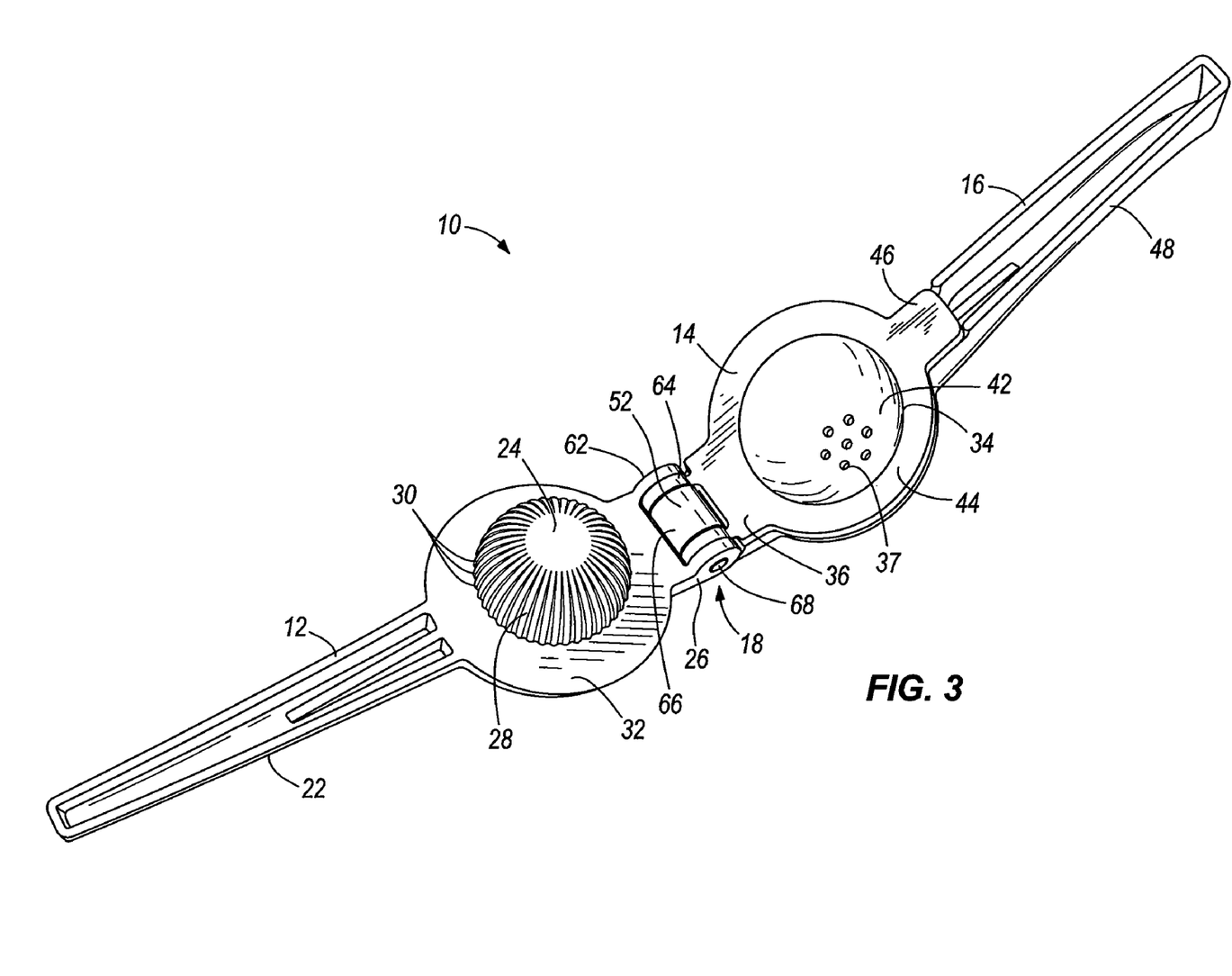
FIG. 3 is a perspective view of a comestible product press according to an embodiment of the present invention.

The cup 34 in the illustrated embodiment has a number of apertures 37 extending therethrough. The apertures 37 can be located anywhere in the cup 34, and in some embodiments (e.g., the embodiment of FIGS. 1A-8), the apertures 37 are located at the bottom of the cup 34. The cup 34 can have any number of apertures 37 having any pattern or patternless arrangement and having any shape and size desired. For example, the cup 34 in the illustrated embodiment has seven round and generally centrally-located apertures 37. As another example, the cup 34 can have a single aperture 37 having a larger or smaller size, can have several rings and/or lines of apertures 37 in the side walls of the cup 34, can have elongated apertures 37 (e.g., slots), apertures 37 having rectangular, elongated, diamond, star, or other shapes, and the like. Still other aperture shapes, sizes, and arrangements are possible, and fall within the spirit and scope of the present invention. In the illustrated embodiment the cup 34 is a substantially closed structure but for the aperture or apertures 37 (e.g. FIGS. 1C, 2A, 2B, 3, 6A, and 6C), and as such the cup 34 substantially covers the protrusion 24 of the first portion 12 when the cup 34 is adjacent to the first portion 12 (FIGS. 2A and 2B).

With particular reference to FIGS. 2A, 2B and 6A-6D, the cup 34 of the second portion 14 can have a profiled outer surface 38, or intermediate protrusion, in order to better facilitate movement of fluid or other comestible product matter across the outer surface 38. The intermediate protrusion, or profiled outer surface 38, in the illustrated embodiment is generally semi-spherical, or hemispherical, in shape (e.g. FIGS. 6B and 6C), although other intermediate protrusion shapes can instead be used, as described above for the cup 34. As will be described in greater detail below, in some embodiments, comestible product can be pressed by the cup 34 of the second portion 14 against the third portion 16. In such embodiments, it may be desirable to permit movement of fluid or other comestible product matter across the outer surface 38 of the cup 34. To this end, a profiled (i.e., non-smooth) outer surface 38 of the cup 34 can better facilitate this movement. In the illustrated embodiment, the cup 34 has a number of ribs 40 extending from a generally central location of the cup 34. In other embodiments, ribs 40 on the cup 34 can extend in any other direction or combination of directions desired. The profiled outer surface 38 of the cup 34 can be defined at least in part by bumps, ribs, or other types of protuberances, dimples, grooves, or other types of apertures, and any combination thereof located on any portion or all of the cup 34.

Figure 6A:
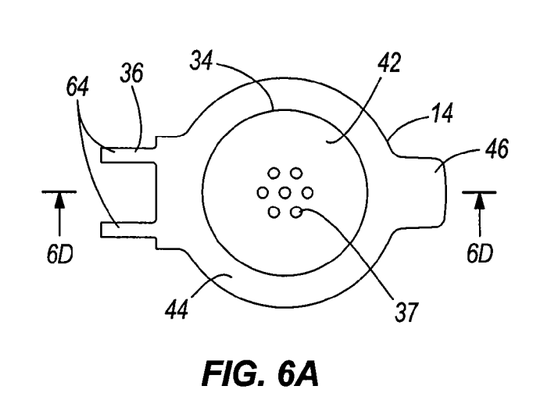
FIGS. 6A-6C are side views of the intermediate member of a comestible product press according to an embodiment of the present invention.
Figure 6B:
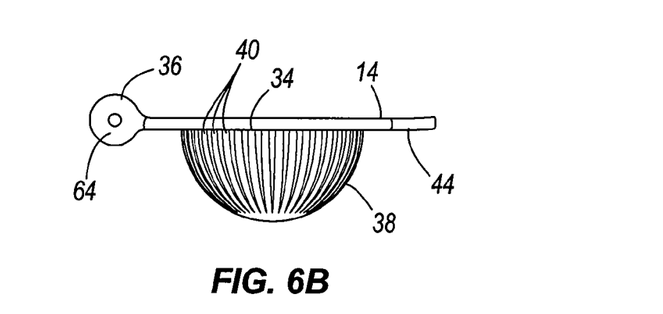
Figure 6C:
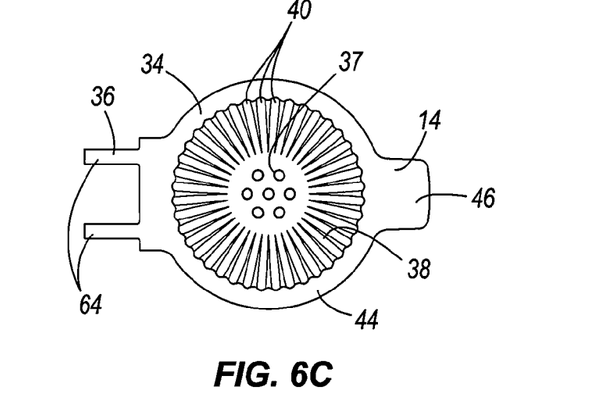
Figure 6D:
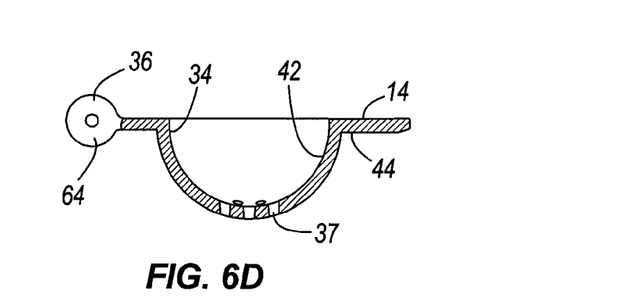
FIG. 6D is a sectional view of the intermediate member of a comestible product press according to an embodiment of the present invention.

In the illustrated embodiment, the cup 34 has a substantially smooth inner surface 42. However, in other embodiments, the inner surface 42 of the cup 34 is profiled. In such embodiments, any portion of the inner surface 42 can be profiled with ribs or any of the other features described above (with reference to the outer surface 38 of the cup 34) having any of the shapes, sizes, and arrangements also described above. A profiled inner surface 42 of the cup 34 can perform the same function described above as the profiled surface 28 of the protrusion 24 of the first portion 12, and can be utilized instead of or in conjunction with the profiled surface 28 of the protrusion 24. The cup 34, or intermediate member, comprises a recess, corresponding to the inner surface 42 (FIG. 6D), and a protrusion, corresponding to the outer surface 38 (FIG. 6C).

In some embodiments, the second portion 14 can also have a peripherally-extending lip 44. The lip 44 can extend in all directions (see the illustrated embodiment of FIGS. 1A-8) or in less than all directions, as desired. Also or instead, the second portion 14 can have a tab 46 that can be manipulated by a user for moving the second portion 14 toward or away from the first and/or third portions 12, 16.

With reference now to FIGS. 7A, 7B, 7C, 7D, and 7E, the third portion 16 of the comestible product press 10 comprises a handle 48, a recess 50, and a hinge portion 52. In the illustrated embodiment, the recess 50 is adjacent one end of the third portion 16 (FIGS. 7A, 7B, 7C, and 7E). The recess 50 in the illustrated embodiment is generally semi-spherical, or hemispherical, in shape (e.g. FIGS. 7A, 7B, 7C, 7D, and 7E), although other recess shapes can instead be used. By way of example only, the recess 50 can instead have any of the shapes described above with reference to the protrusion 24 of the first portion 12. In some embodiments, the recess 50 has a shape generally corresponding to the shape of the cup 34 of the second portion 14. In other embodiments, the recess 50 has a shape different from that of the cup 34 of the second portion 14. In the illustrated embodiment, the surface contour of the recess 50 in the third portion 16 is substantially the same shape as, although slightly larger than, the surface contour of the cup 34 in the second portion 14 (e.g. FIG. 4C). Similarly, in the illustrated embodiment the surface contour of the protrusion 24 of the first portion 12 is substantially the same shape as, although slightly smaller than, the surface contour of the cup 34 in the second portion 14 (e.g. FIG. 4C). The recess 50, the cup 34, and the protrusion 24 can be substantially the same shape even if they have a profiled or non-smooth surface, e.g. ribs, superimposed thereon (e.g. FIGS. 5B, 5C, 6B, and 6C).

The recess 50 in the third portion 16 of the illustrated embodiment also defines a protrusion 54 on an opposite side of the third portion 16. The protrusion 54 of the third portion 16 can have any shape desired. For example, the protrusion 54 can have any of the shapes described above with regard to the protrusion 24 of the first portion 12. In some embodiments, the protrusion 54 of the third portion 16 has a shape generally corresponding to the shape of the recess 50. In other embodiments, the third portion 16 has a protrusion 54 with a shape different from that of the recess 50, or has no protrusion 54 at all.

As best shown in FIG. 4C, the recess 50 of the third portion 16 in the illustrated embodiment is shaped and dimensioned to receive the cup 34 of the second portion 14. In other embodiments, the recess 50 is shaped and dimensioned to partially receive the cup 34 of the second portion 14, such as the bottom half of the cup 34. Accordingly, the cup 34 can be nested within the recess 50 of the third portion 16, and in some embodiments can be smaller than the recess 50.

The recess 50 in the illustrated embodiment has a number of apertures 56 extending therethrough. The apertures 56 can be located anywhere in the recess 50, and in some embodiments (e.g., the embodiment of FIGS. 1A-8), the apertures 56 are located at the bottom of the recess 50. The recess 50 can have any number of apertures 56 having any pattern or patternless arrangement and having any shape and size desired. For example, the recess 50 in the illustrated embodiment has seven round and generally centrally-located apertures 56. As another example, the recess 50 can have a single aperture 56 having a larger or smaller size, can have several rings and/or lines of apertures 56, 56' in the side walls of the recess 50, can have elongated apertures (e.g., slots), apertures having rectangular, elongated (FIG. 2B), diamond, star, or other shapes, and the like. Still other aperture shapes, sizes, and arrangements are possible, and fall within the spirit and scope of the present invention.

The recess 50 and protrusion 54 in the illustrated embodiment have substantially smooth surfaces. However, in other embodiments, the surface 58 of the recess 50 and/or the surface 60 of the protrusion 54 can be profiled in order to better facilitate movement of fluid or other comestible product matter across such surfaces. As mentioned above, in some embodiments, comestible product can be pressed by the cup 34 of the second portion 14 against the third portion 16. In such embodiments, a profiled surface of the recess 50 (whether used in conjunction with a profiled outer surface 38 of the cup 34 or not) can permit movement of fluid or other comestible product matter across the surface 58 of the recess 50. To this end, the recess 50 of the third portion 16 can have any number of ribs or other surface features defining a profiled surface, including any of the surface features described above with reference to the profiled surface 28 of the protrusion 24.

As mentioned above, the surface 60 of the protrusion 54 in the illustrated embodiment can be profiled. Such a surface can be defined by any of the features described above with reference to the profiled surface 28 of the protrusion 24. A profiled surface 60 of the protrusion 54 can be useful in those embodiments in which the third portion 16 is pivoted (as described below) to press comestible product directly between the first and third portions 12, 16.

Figure 5A:
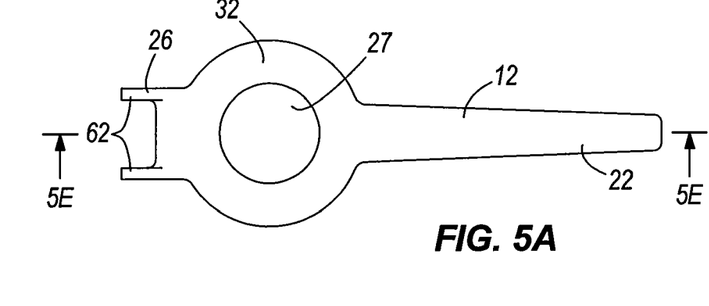
FIGS. 5A-5C are side views of a comestible product press according to an embodiment of the present invention.
Figure 5B:
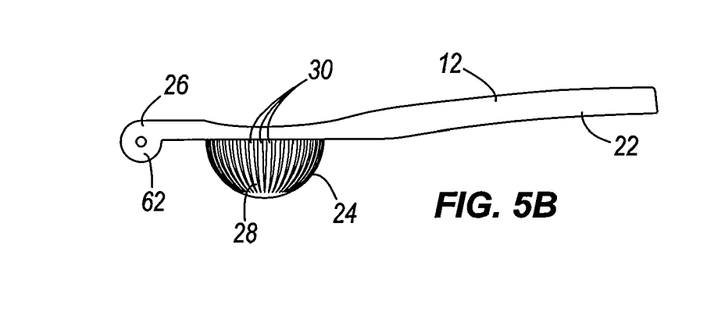
Figure 5C:
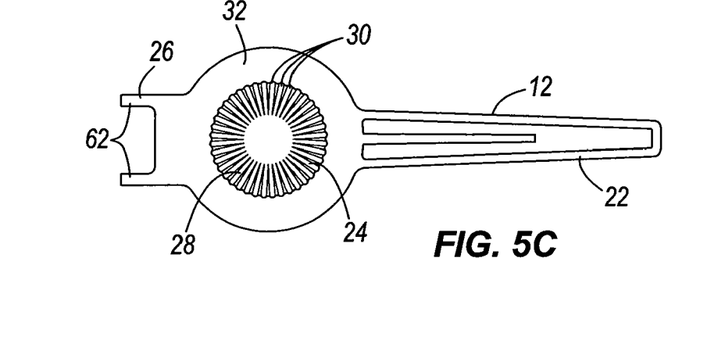
Figure 5D:
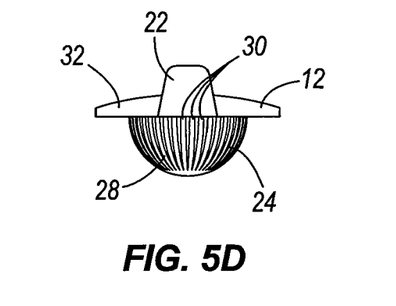
FIG. 5D is an end view of a comestible product press according to an embodiment of the present invention.
Figure 5E:
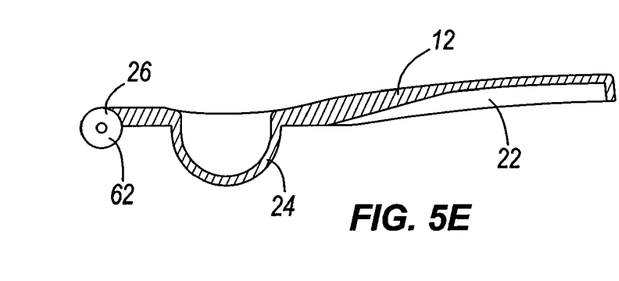
FIG. 5E is a sectional view of a comestible product press according to an embodiment of the present invention.
Figure 7A:
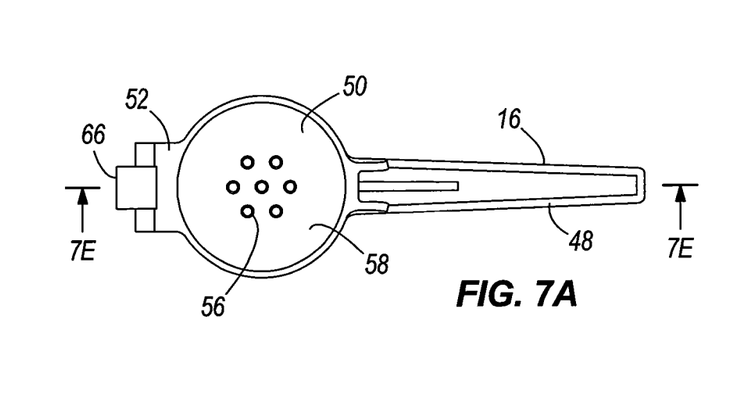
FIGS. 7A-7C are side views of a comestible product press according to an embodiment of the present invention.
Figure 7B:
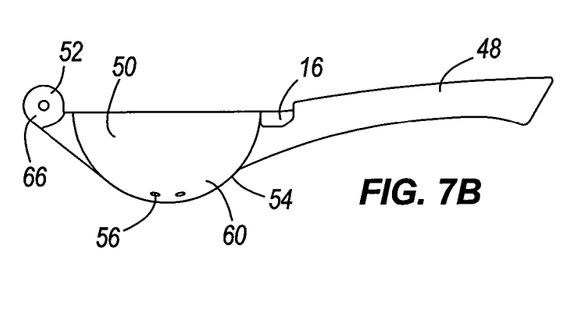
Figure 7C:
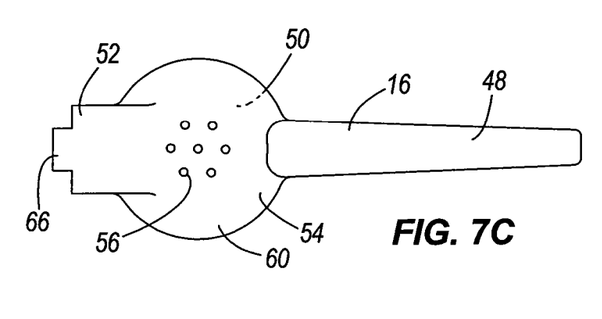
Figure 7D:
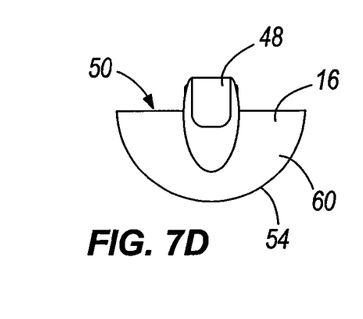
FIG. 7D is an end view of a comestible product press according to an embodiment of the present invention.
Figure 7E:
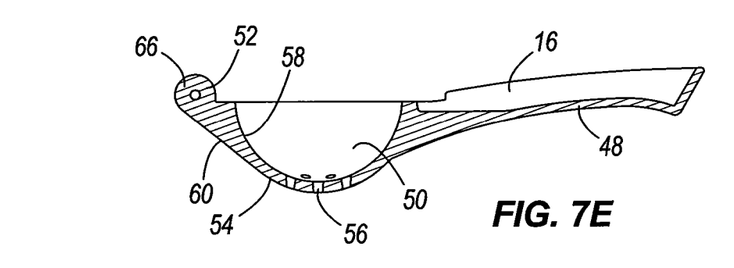
FIG. 7E is a sectional view of a comestible product press according to an embodiment of the present invention.
Figure 8:
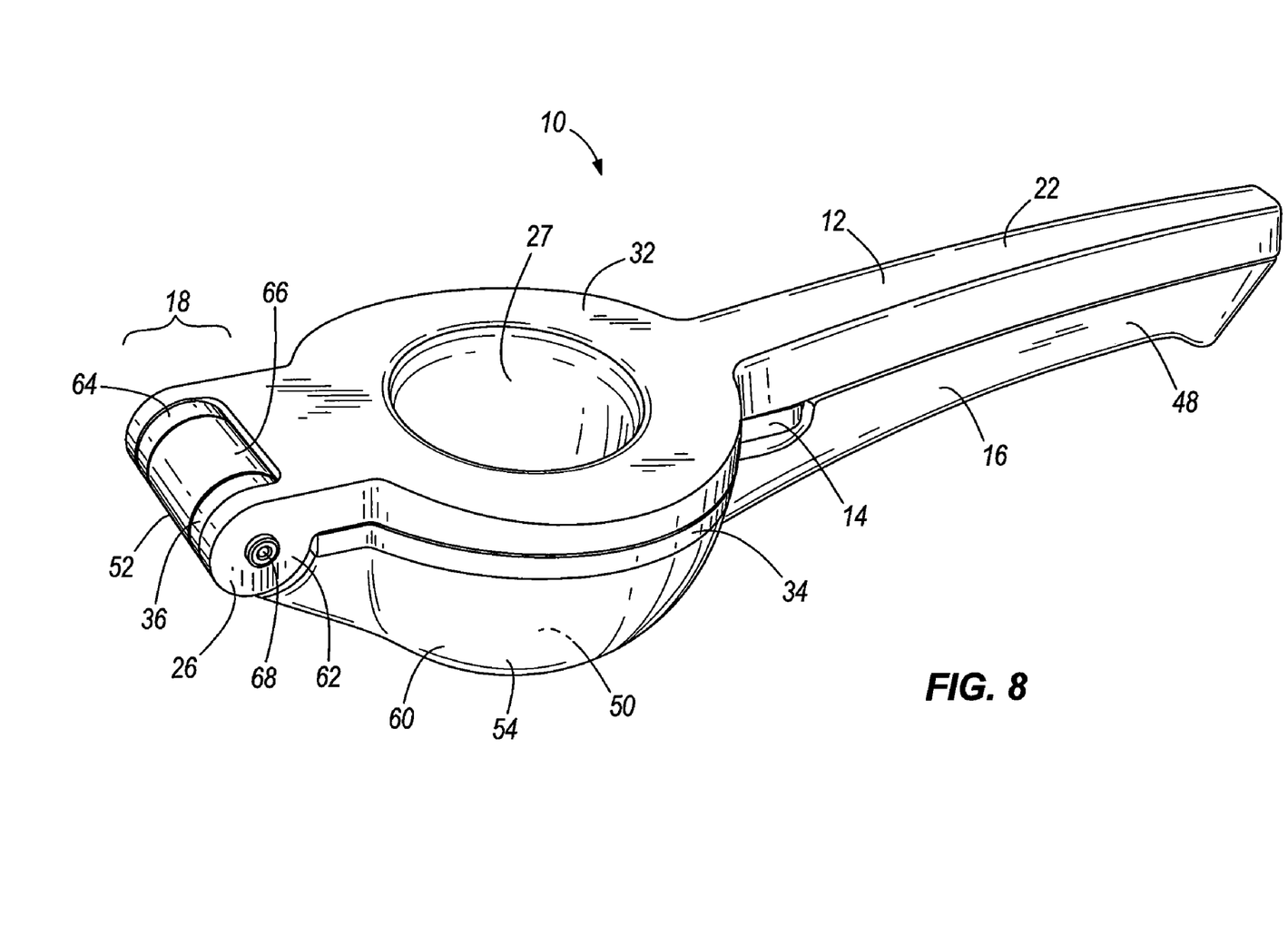
FIG. 8 is a perspective view of a comestible product press according to an embodiment of the present invention.

As described above, the comestible product press 10 of the illustrated embodiment has a hinge 18 about which the first, second, and third portions 12, 14, 16 can move. The hinge 18 of the illustrated embodiment comprises the hinge portions 26, 36, 52 of the first, second, and third portions 12, 14, 16, respectively. The hinge portions 26, 36, 52 can have any shape and can be connected together in any manner enabling pivoting motion between the first, second, and third portions 12, 14, 16. In the illustrated embodiment, for example, each of the first, second, and third portions 12, 14, 16 is provided with one or more bosses 62, 64, 66 in which a hinge pin 68 is received to pivotably connect the bosses 62, 64, 66 (and therefore, the first, second, and third portions 12, 14, 16). With reference to FIGS. 5A, 6A, and 7A, the first portion 12 has two bosses 62 between which are received two bosses 64 of the second portion 14, between which is received a single boss 66 of the third portion 16. In other embodiments, any of the hinge portions 26, 36, 52 can have any number of bosses 62, 64, 66 in any other arrangement permitting pivotable connection of the hinge portions 26, 36, 52.

It will be appreciated that the hinge 18 utilized in the illustrated embodiment of FIGS. 1A-8 is one of several hinges that can be utilized to pivotably connect the first, second, and third portions 12, 14, 16 of the comestible product press 10. Any other type of hinge 18 can instead be used while still falling within the spirit and scope of the present invention. For example, any of the first, second, and third portions 12, 14, 16 can be connected by one or more ball joints. As another example, the hinge portions 26, 36, 52 can be shaped to eliminate the need for a separate hinge pin 68, such as by utilizing mating boss shapes for each of the hinge portions 26, 36, 52. Also, the hinge portions 26, 36, 52 of other embodiments need not necessarily include one or more bosses 62, 64, 66 as described above, and can instead be defined by any other part of the first, second, and third portions 26, 36, 52 coupled together about a pivot axis 20. For example, a hinge pin 68 can be received within apertures located elsewhere in the first, second, and third portions 26, 36, 52 (i.e., not necessarily located in bosses extending away from the main body of each portion 26, 36, 52).

The hinge 18 illustrated in FIGS. 1A-8 is located at an end of the comestible product press 10, and is defined by hinge portions 26, 36, 52 located at respective ends of the first, second, and third portions 12, 14, 16. In other embodiments, the hinge 18 can be located in other positions on the comestible product press 10, such as between the handle 22 and protrusion 24 of the first portion 12, and between the handle 48 and recess 50 of the third portion 16 (in which case the handles 22, 48 could be shaped to be operated in a manner similar to operating scissors). As another example, the hinge 18 can be located a greater distance or a smaller distance from the handles 22, 48 illustrated in FIGS. 1A-8, such as by increasing the size of the bosses 62, 64, 66 and/or by changing the shape of the first, second, and third portions 12, 14, 16.

The first, second, and third portions 12, 14, 16 of the comestible product press 10 can be permanently connected together at the hinge 18, such as by using a rivet or other permanent fastener as the hinge pin 68. Such a permanent connection can eliminate the chance of losing one or more portions 12, 14, 16 of the comestible product press 10. In other embodiments, one or more portions 12, 14, 16 can be disconnected and removed, such as for cleaning or replacement with another portion 12, 14, 16 having a different size and/or shape (e.g., for pressing other types of products). In some embodiments, the second portion 14 has no hinge portion 36, and is only inserted between the first and second portions 12, 16 of the comestible product press 10 as needed.

The first, second, and third portions 12, 14, 16 of the comestible product press 10 can be color-coded to enable a user to more quickly identify the use and/or working positions of the first, second, and third portions 12, 14, 16. For example, the first and third portions 12, 16 can have a first color, while the second portion 14 can have another color indicating a use for a particular type of comestible product. In the illustrated embodiment of FIGS. 2A-4D by way of example only, the first and third portions 12, 16 can be yellow, indicating to a user that a lemon can be placed in the recess 50 of the third portion 16, whereas the second portion 14 can be green, indicating to the user that a lime can be placed in the cup 34 of the second portion 14. Any other colors and combinations of colors can be utilized for pressing other types of comestible products.

In some embodiments, the cup 34 and recess 50 of the comestible product press 10 have different shapes and/or sizes, thereby being adapted for pressing different types and/or sizes of comestible product. For example, the smaller cup 34 in the illustrated embodiment of FIGS. 1A-8 can be better adapted to press limes than lemons. Similarly, the recess 50 in the illustrated embodiment of FIGS. 1A-8 can be better adapted to press lemons than limes. Accordingly, the first, second, and third portions 12, 14, 16 of the comestible product press 10 can be adapted to press different shapes and/or sizes of comestible product between the first and second portions 12, 14 and between the second and third portions 14, 16, thereby significantly increasing the effectiveness of the comestible product press 10 for a given type of comestible product.

In order to order to operate the comestible product press 10 illustrated in FIGS. 1A-8, a piece of comestible product is placed in the cup 34 of the second portion 14 or in the recess 50 of the third portion 16. In some embodiments, the comestible product can be oriented in a particular manner within the cup 34 or recess 50 for improved pressing results (e.g., cut face down, in the case of pressing many types of fruits or vegetables). For a large product, the second portion 14 can be placed in a raised position in order to insert the comestible product within the recess 50 of the third portion 16 (see FIGS. 1B, 2A, and 2B). For example, a lemon can be placed into the recess 50 of the third portion 16 when the second portion 14 is in the raised position as illustrated in FIG. 1D. For a smaller product, the second portion 14 can be placed in a lowered position in order to insert the comestible product within the cup 34 of the second portion 14 (see FIGS. 1C and 3). For example, a lime can be placed into the cup 34 of the second portion 14 when the second portion 14 is in the lowered position as illustrated in FIG. 1E. The comestible product can then be squeezed when the handles 22, 48 are swung and forced toward one another, creating pressure on the comestible product within the cup 34 or recess 50. The pressure can be used to force fluid from the comestible product (which can drain from the comestible product press 10 via the apertures 37, 56) and/or to change the shape or state of the comestible product.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the first, second, and third portions 12, 14, 16 of the comestible product press 10 need not necessarily be pivotable about a common axis 20 as shown in the illustrated embodiment. In some embodiments, the first, second, and third portions 12, 14, 16 are pivotable about two different axes (e.g., the first and second portions 12, 14, being pivotable about one axis, and the second and third portions 14, 16 being pivotable about another axis). In such alternative embodiments, the comestible product press 10 can have more than one hinge 18, such as by utilizing more than one hinge pin 68 to pivotably connect the first, second, and third portions 12, 14, 16.

As another example, in some embodiments, the first and third portions 12, 16 of the comestible product press 10 can be pivoted with respect to one another between a first state in which the second portion 14 is located between the first and third portions 12, 16 (as is shown in FIGS. 1A and 4C) to a second state in which the recess 27 of the first portion 12 at least partially receives the protrusion 54 of the third portion 16. Depending at least in part upon the shape and size of the recess 27 and protrusion 54, the first and third portions 12, 16 can therefore enable yet another size and/or type of comestible product to be pressed by the comestible product press 10 (i.e., directly between the first and third portions 12, 16).

What is claimed is:

1. A comestible product press comprising:
    a first handle having first and second ends;
    a second handle having first and second ends, wherein the first and second handles are hingedly connected to one another at their first ends;
    a first protrusion on the first handle, the first protrusion being a single, continuous, convex structure extending toward the second handle when the first and second handles are positioned to define an acute angle therebetween;
    a second protrusion on the second handle, the second protrusion extending away from the first handle when the first and second handles are positioned to define an acute angle therebetween; and
    an intermediate member moveably connected to at least one of the first and second handles, wherein the intermediate member substantially fills the space between the first and second protrusions when the first and second handles are brought together, the intermediate member comprising a plurality of apertures,
    wherein the first protrusion and the intermediate member, upon being brought together, define a first space therebetween sized to receive a first comestible product, and
    wherein the second protrusion and the intermediate member, upon being brought together, define a second space therebetween sized to receive a second comestible product, the second space being substantially the same shape as, but larger than, the first space.

2. The comestible product press of claim 1 wherein the intermediate member is substantially the same shape as the first protrusion and the second protrusion.

3. The comestible product press of claim 1 wherein the intermediate member is a substantially closed structure.

4. The comestible product press of claim 1 wherein at least one of the first protrusion and the intermediate member comprises a plurality of ribs thereon.

5. A comestible product press comprising:
    a first handle having a handle recess;
    a second handle hingedly connected to the first handle, the second handle having a convex handle protrusion extending toward the handle recess in the first handle when the first and second handles are positioned to define an acute angle therebetween; and
    an intermediate member disposed between the first and second handles and moveably connected to at least one of the first and second handles, the intermediate member comprising a continuous surface defining a convex intermediate protrusion and a concave intermediate recess, the intermediate member surface having a plurality of apertures therethrough;

wherein the surface contours of the handle recess and the intermediate recess are substantially the same shape, and the surface contours of the handle protrusion and the intermediate protrusion are substantially the same shape, wherein the handle protrusion and the intermediate recess, upon being brought together, define a first space therebetween sized to receive a first comestible product, and wherein the handle recess and the intermediate protrusion, upon being brought together, define a second space therebetween sized to receive a second comestible product, the second space being substantially the same shape as, but larger than, the first space.

6. The comestible product press of claim 5 wherein the intermediate member substantially fills the space between the handle recess and the handle protrusion when the first and second handles are brought together.

7. The comestible product press of claim 5 wherein the intermediate member is a substantially closed structure.

8. The comestible product press of claim 5 wherein the intermediate protrusion is disposed adjacent to and nests within the handle recess to permit the squeezing of a comestible product therebetween.

9. The comestible product press of claim 5 wherein the handle protrusion is disposed adjacent to and nests within the intermediate recess to permit the squeezing of a comestible product therebetween.

10. The comestible product press of claim 5 wherein the handle protrusion and the intermediate protrusion are each substantially hemispherical in shape and at least one of the handle protrusion and the intermediate protrusion comprises a plurality of ribs thereon.

11. A comestible product press comprising:
a first member having a handle portion and a concave first recess disposed at one end of the handle portion, wherein the first recess is a single, undivided space;

a second member having a handle portion and a convex first protrusion disposed at one end of the handle portion, the first protrusion shaped complementary to the first recess, wherein the first and second members are moveably connected together adjacent the first recess and first protrusion, the first and second members movable between an open and closed position; and an intermediate member moveably connected to at least one of the first and second members, the intermediate member comprising a concave second recess and a convex second protrusion, wherein the intermediate member is disposed between the first protrusion and the first recess when the first and second members are in the closed position, wherein the intermediate member is a substantially closed structure except for a plurality of apertures therein, wherein the first protrusion and the second recess, upon being brought together, define a first space therebetween sized to receive a first comestible product, and wherein the second protrusion and the first recess, upon being brought together, define a second space therebetween sized to receive a second comestible product, the second space being substantially the same shape as, but larger than, the first space.

12. The comestible product press of claim 11 wherein the intermediate member substantially fills the space between the first recess and first protrusion when the first and second members are brought together.

13. The comestible product press of claim 11 wherein the surface contours of the first recess and the second recess are substantially the same shape, and the surface contours of the first protrusion and the second protrusion are substantially the same shape.

14. The comestible product press of claim 11 wherein the intermediate member is substantially hemispherical in shape.

15. The comestible product press of claim 11 wherein the intermediate member substantially covers the first protrusion when the intermediate member is adjacent the second member.

\* \* \* \* \*